Inventor
George M. Underwood,
By McMorrow & Berman
Attorneys

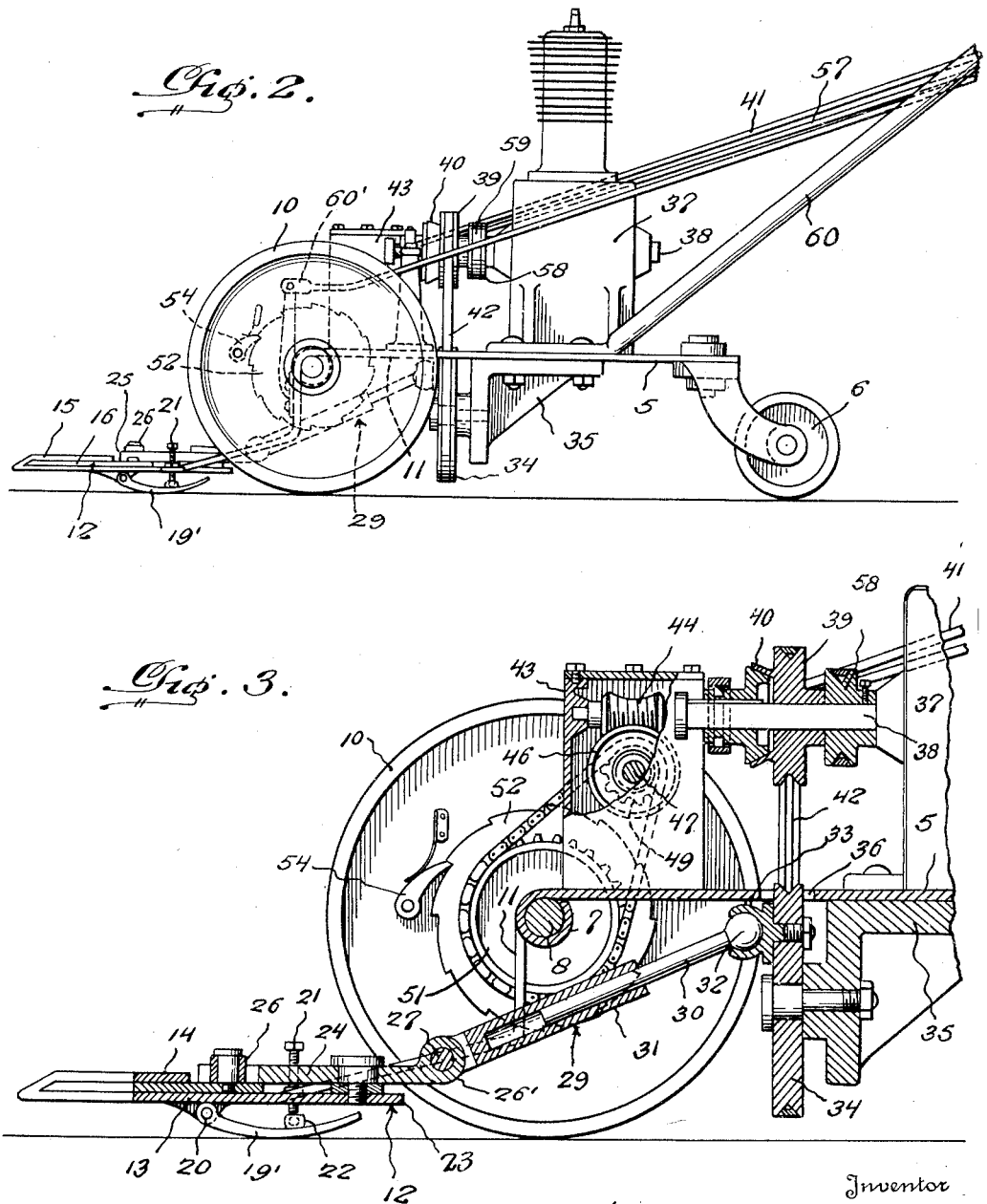

Patented June 30, 1942

2,288,498

UNITED STATES PATENT OFFICE 2,288,498

MOWER

George M. Underwood, Watertown, S. Dak.

Application November 6, 1941, Serial No. 418,069

2 Claims. (Cl. 56—26)

This invention relates to power mowers of the type for cutting lawns and the like wherein it is desired to cut the grass close to the surface of the ground, and has for the primary object the provision of a device of this character which will reduce to a minimum the amount of manual labor necessary for its operation by making provision for its propulsion and the driving of its cutting mechanism by a power source, requiring the operator to only steer or guide the device over the area to be cut.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a fragmentary top plan view illustrating a power mower constructed in accordance with my invention.

Figure 2 is a side elevation illustrating the device.

Figure 3 is a fragmentary vertical sectional view illustrating the drive mechanism between the power source and the cutting mechanism as well as one of the traction wheels of the mower.

Figure 1:
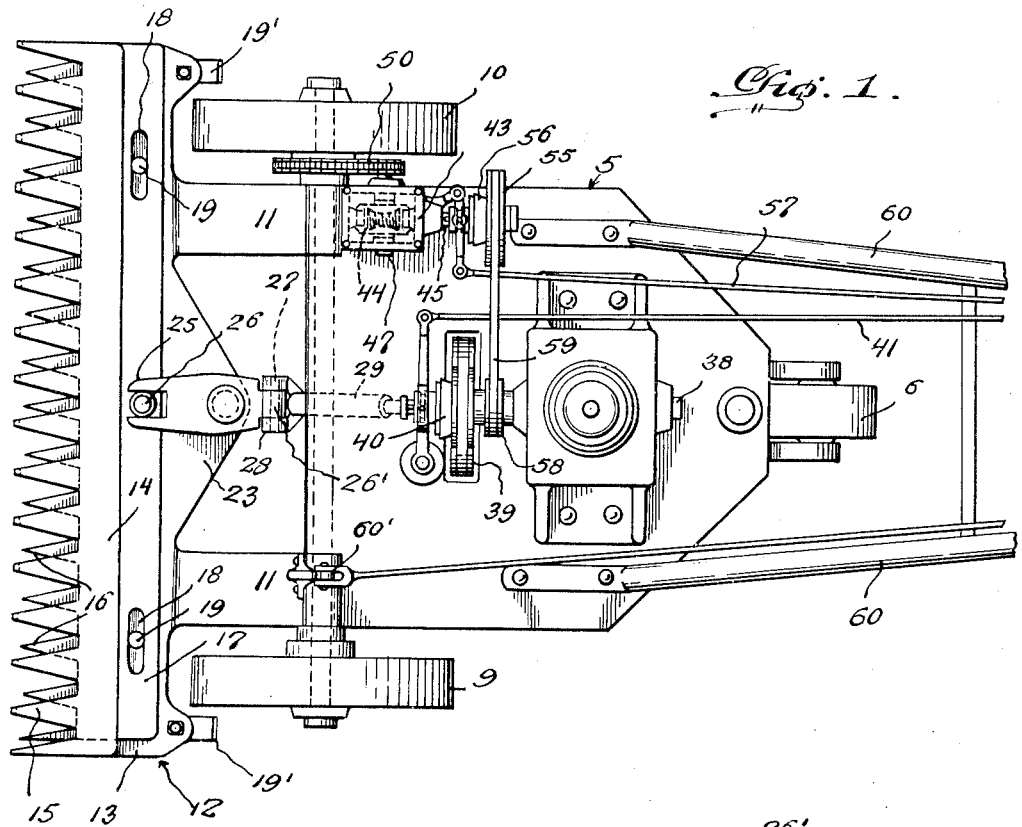
Figure 4:
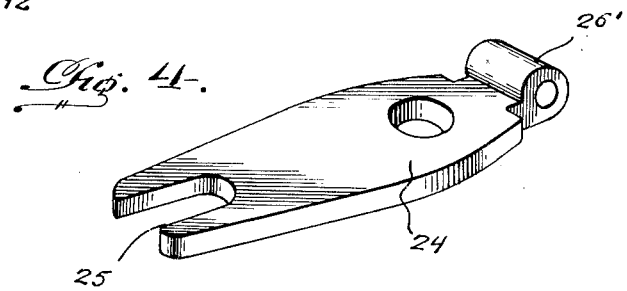
Figure 4 is a perspective view illustrating an actuating plate of the cutting mechanism.
Figure 5:
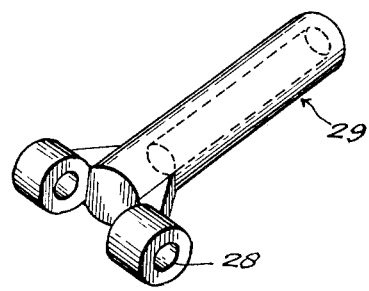
Figure 5 is a perspective view illustrating one section of a pitman.

Referring in detail to the drawings, the numeral 5 indicates a horizontally arranged platform, the rear end of which is supported by a pilot type wheel 6. The platform 5 toward its rear end is reduced in width, as clearly shown in Figure 1 and the forward edge thereof has cutaway portions located adjacent to the side edges of the platform and said forward edge is rolled upon itself to form a journal 7 to receive an axle 8 on which ground wheels 9 and 10 are journaled. The forward cutaway edges of the platform 5 make provision for journaling on the axle 8 substantially L-shaped arms 11 integral with a cutting mechanism 12. The arms 11 are free to swing upwardly and downwardly on the axle to permit the cutting mechanism 12 to adjust itself to the surface of the ground and ride freely over irregularities on the surface of said ground.

The cutting mechanism 12 includes a plate 13 on which the arms 11 are integrally formed. The plate 13 is provided with a series of slots and is bent upon itself to form upper and lower guide portions 14. The bend of the plate 13 traverses the slots forming the latter into guard teeth 15 and operating for reciprocation with relation to the guard teeth are cutting teeth 16 forming a part of a sickle bar 17 slidably supported between the upper and lower guide portions 14 and 15 of the cutting mechanism.

The sickle bar 17 is provided with slots 18 through which pins 19 project. The pins are carried by the lower guide portion. Shoes of arcuate formation indicated by the character 19' are pivoted on the lower guide portion 14 of the cutting mechanism, as shown at 20, and are adapted to ride the surface of the ground for regulating the distance of the guard teeth and cutting teeth from the ground. Set bolts 21 are threaded in the plate 13 and have ball and socket connections 22 with the shoes 19' providing means for adjusting the shoes on their pivots 20 to vary the distance of the cutting mechanism from the surface of the ground and consequently provide means for regulating the height of cut made by the cutting mechanism.

A rearwardly extending projection or extension 23 is formed on the plate 13 and has pivoted thereon an operating plate 24, the forward end of which is bifurcated, as at 25, to engage with a roller 26 carried by the sickle bar 17. The other end of the operating plate 24 is equipped with a barrel 26' to receive a pivot pin 27 that extends through barrels 28 of a pitman 29. The pitman 29 is of sectional formation, the sections being indicated by the characters 30 and 31. The section 30 has a telescopic fit with the section 31 whereby the pitman may be self-adjusting as to length. The section 30 carries a ball 32 fitting within a cup or socket 33 eccentrically mounted on a drive pulley 34. The drive pulley is journaled on a bracket 35 mounted on the under face of the platform adjacent a slot 36 provided in the platform.

A prime mover 37 in the form of a small internal combustion engine is mounted on the platform rearwardly of the slot 36 and its power takeoff shaft is indicated by the character 38. A drive pulley 39 is connected to the power takeoff shaft 38 by a clutch 40, the control of which is indicated by the character 41.

The pulleys 34 and 39 are connected by an endless belt 42 which travels through the slot 36 in the platform. The rotation of the pulley 34 by the prime mover brings about reciprocation of the sickle bar and the teeth coacting with the guard teeth sever the grass through the use of a minimum amount of power.

A gear box 43 is mounted on the platform 5 and has therein a worm 44 carried by a shaft 45. The worm 44 meshes with a worm gear 46 secured on a shaft 47. The shafts 45 and 47 are journaled in the gear box. The shaft 47 has secured thereto a sprocket gear 49 over which is trained a sprocket chain 50. The sprocket chain 50 is also trained over a sprocket gear 51 journaled on the axle 8 adjacent the wheel 10. Integral with the sprocket gear 51 is a ratchet gear 52 engaged by a spring influenced pivoted dog 54 carried by the ground wheel 10. The ratchet gear 52 and dog 54 establish a ratchet drive between the sprocket gear 51 and the ground wheel 10, the purpose of which is to permit the ground wheel 10 to rotate free of the drive mechanism in one direction. This is desirable when making turns from a straight course with the device.

The shaft 45 has a belt pulley 55 connected thereto by a clutch 56, the control of which is indicated by the character 57. A drive pulley 58 is secured on the power takeoff shaft 38 of the prime mover and is connected to the pulley 55 by an endless belt 59.

Thus it will be seen that one of the ground wheels of this device is driven by the prime mover under control of the operator, that is, the operator can at any time establish or interrupt the drive of the prime mover on the ground wheel. Further, it will be noted that the operator can control the drive between the prime mover and the cutting mechanism at will.

Handle bars 60 are secured to the platform and extend rearwardly thereof whereby the operator walking behind the device can readily steer the latter in any course desired.

A hand control 60' is connected to one of the arms 11 whereby the operator may manually raise the cutting mechanism 12 when desired.

From the foregoing description taken in connection with the accompanying drawings, it will be seen that a very practical and efficient mower has been provided wherein the cutting mechanism power driven will readily follow the contour of the ground and may be adjusted relative thereto for varying the height of cut or the growth on the ground. Further it will be seen that the manual effort in the operation of this device is reduced to a minimum owing to the fact that the propulsion of the device and the operation of the cutting mechanism is brought about by a power medium mounted on said device, requiring only the effort of the operator to steer the device in the successful operation thereof.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a mower, a horizontally arranged bed plate, an axle arranged transversely of and at the forward edge of the bed plate, said bed plate having the forward portion thereof rolled to provide a bearing receiving the axle and cut away to expose portions of the axle inwardly of side edges of the bed plate, ground wheels journaled on the axle outwardly of the side edges of the plate, substantially L-shaped arms journaled on the exposed portions of the axle for free upward and downward movement forwardly of the axle and bed plate, a cutter mechanism carried by the arms to ride the ground, a power means mounted on the bed plate, and a drive means connecting said power means to the cutter mechanism and one of the ground wheels.

2. In a cutter mechanism for mowers, a plate, substantially L-shaped arms integral with an edge of said plate and formed with bearing portions to permit journaling thereof on a portable mower construction, said plate provided with a plurality of slots and bent on itself across the slots to form guard teeth and upper and lower sickle bar guide portions, a sickle bar slidable between said guide portions and including cutting blades to coact with the guard teeth in cutting growth, said cutter bar having slots, and pins on the lower guide portion and extending into the latter-named slots for limiting the sliding movement of the cutter bar.

GEORGE M. UNDERWOOD.